United States Patent
Chen et al.

(10) Patent No.: US 7,796,825 B2
(45) Date of Patent: Sep. 14, 2010

(54) LOSSLESSLY IMPROVING COMPRESSION OF COMPRESSED IMAGE DATA

(75) Inventors: Wen-hsiung Chen, Sunnyvale, CA (US); Dov Rosenfeld, Oakland, CA (US)

(73) Assignee: Cisco Technology, Inc., San Jose, CA (US)

(*) Notice: Subject to any disclaimer, the term of this patent is extended or adjusted under 35 U.S.C. 154(b) by 881 days.

(21) Appl. No.: 11/675,773

(22) Filed: Feb. 16, 2007

(65) Prior Publication Data

US 2008/0199088 A1  Aug. 21, 2008

(51) Int. Cl.
*G06K 9/36* (2006.01)

(52) U.S. Cl. ..................................... 382/232

(58) Field of Classification Search ......... 382/232–251; 375/240.01–240.28; 341/65–67, 59, 106–107; 358/426.01–426.16
See application file for complete search history.

(56) References Cited

U.S. PATENT DOCUMENTS

| 4,698,672 | A | 10/1987 | Chen et al. ................ 358/136 |
| 6,442,207 | B1* | 8/2002 | Nishikawa et al. ...... 375/240.26 |
| 6,611,624 | B1* | 8/2003 | Zhang et al. ................ 382/232 |
| 7,162,080 | B2* | 1/2007 | Chui et al. ................... 382/168 |
| 7,203,372 | B1 | 4/2007 | Chen et al. ................... 382/244 |
| 7,212,681 | B1 | 5/2007 | Chen et al .................... 382/248 |
| 7,242,328 | B1 | 7/2007 | Chen et al. ..................... 341/67 |
| 7,466,863 | B2* | 12/2008 | Ito ............................... 382/232 |
| 7,501,964 | B2* | 3/2009 | Mittal et al. .................. 341/107 |
| 7,541,948 | B2* | 6/2009 | Kadono et al. ................. 341/67 |
| 2003/0118240 | A1* | 6/2003 | Satoh et al. ................... 382/239 |
| 2004/0228540 | A1 | 11/2004 | Chen et al. ................... 382/246 |
| 2005/0276487 | A1 | 12/2005 | Chen et al. ................... 382/232 |
| 2005/0276497 | A1 | 12/2005 | Chen et al. ................... 382/245 |
| 2005/0276498 | A1 | 12/2005 | Chen et al. ................... 382/245 |
| 2005/0276499 | A1 | 12/2005 | Wu et al. ...................... 382/245 |
| 2006/0039615 | A1 | 2/2006 | Chen et al. ................... 382/232 |
| 2006/0039616 | A1 | 2/2006 | Chen et al. ................... 382/232 |
| 2006/0039620 | A1 | 2/2006 | Chen et al. ................... 382/245 |
| 2006/0039621 | A1 | 2/2006 | Toebes et al. ................. 382/245 |
| 2006/0056720 | A1 | 3/2006 | Chen et al. ................... 382/245 |
| 2007/0019877 | A1 | 1/2007 | Chen et al. ................... 382/245 |
| 2008/0170613 | A1* | 7/2008 | Tian et al. ............... 375/240.03 |
| 2008/0199088 | A1* | 8/2008 | Chen et al. ................... 382/232 |

FOREIGN PATENT DOCUMENTS

WO  WO 2006/001994  1/2006

* cited by examiner

*Primary Examiner*—Sherali Ishrat
(74) *Attorney, Agent, or Firm*—Dov Rosenfeld; Inventek

(57) ABSTRACT

For data compressed using the first compression method that includes codewords generated by variable length coding sets of quantized transform coefficients using a first variable length coding method, decoding the codewords to create ordered sets of quantized transform coefficients, each created set forming an ordered series of quantized transform coefficients, and re-encoding the created ordered sets of quantized transform coefficients using a second variable length coding method to produce a re-coded set of codewords. The second variable length coding method produces shorter codewords, on average, than the first variable length coding method. The decoding and re-encoding is a lossless process such that no additional quantization or other errors are introduced to the received data by the method.

20 Claims, 15 Drawing Sheets

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 7

| Zero run-length | Nonzero cluster of 1 (with run-length = 1, 2,..., 8) | | | | | | | |
|---|---|---|---|---|---|---|---|---|
| | 1 | x | 11 | 1x | x1 | xx | 11111111 | ... | xxxxxxxx |
| 0 | (0,1,1) | (0,1,x) | (0,2,11) | (0,2,1x) | (0,2,x1) | (0,2,xx) | (0,8,11111111) | ... | (0,8,xxxxxxxx) |
| 1 | (1,1,1) | (1,1,x) | (1,2,11) | (1,2,1x) | (1,2,x1) | (1,2,xx) | (1,8,11111111) | ... | (1,8,xxxxxxxx) |
| 2 | (2,1,1) | (2,1,x) | (2,2,11) | (2,2,1x) | (2,2,x1) | (2,2,xx) | (2,8,11111111) | ... | (2,8,xxxxxxxx) |
| 3 | (3,1,1) | (3,1,x) | (3,2,11) | (3,2,1x) | (3,2,x1) | (3,2,xx) | (3,8,11111111) | ... | (3,8,xxxxxxxx) |
| 4 | (4,1,1) | (4,1,x) | (4,2,11) | (4,2,1x) | (4,2,x1) | (4,2,xx) | (4,8,11111111) | ... | (4,8,xxxxxxxx) |
| 5 | (5,1,1) | (5,1,x) | (5,2,11) | (5,2,1x) | (5,2,x1) | (5,2,xx) | (5,8,11111111) | ... | (5,8,xxxxxxxx) |
| 6 | (6,1,1) | (6,1,x) | (6,2,11) | (6,2,1x) | (6,2,x1) | (6,2,xx) | (6,8,11111111) | ... | (6,8,xxxxxxxx) |
| 7 | (7,1,1) | (7,1,x) | (7,2,11) | (7,2,1x) | (7,2,x1) | (7,2,xx) | (7,8,11111111) | ... | (7,8,xxxxxxxx) |
| 8 | (8,1,1) | (8,1,x) | (8,2,11) | (8,2,1x) | (8,2,x1) | (8,2,xx) | (8,8,11111111) | ... | (8,8,xxxxxxxx) |

FIG. 13

LOSSLESSLY IMPROVING COMPRESSION OF COMPRESSED IMAGE DATA

FIELD OF THE INVENTION

The present invention is related to image and video compression.

BACKGROUND

Compressed images that are compressed using transform compression methods are common. For example, for still images, the JPEG standard, and for moving images, standards such as motion JPEG, MPEG1, MPEG2, MPEG4, ITU-T H.261, H,263, MPEG4 part 10 (AVC), also known as ITU-H.264, and VC-1 are known and common. In the case of video, each of these compression methods include partitioning an image into blocks, e.g., 8 by 8 blocks, estimating motion, compensating for motion to determine motion compensated residual image blocks, transforming the image blocks, and quantizing the transform coefficients. The quantized transform coefficients are then ordered, e.g., along a zig-zag path on the two-dimensional transform domain, and the ordered series of quantized coefficients entropy encoded, e.g., using the two-dimensional variable length coding method such as originally described in U.S. Pat. No. 4,698,672 to inventor Chen.

There often are situations when image data is provided in already compressed form. For example, in video distribution, MPEG-2 is commonly used. In a video distribution chain, there may be some links that are particularly expensive. For example, there may be one or more satellite links in the distribution chain. Alternatively, in distributing images over cellular telephones, the bandwidth is rather limited. In each such situation, there is incentive to use an efficient compression method at least for the most critical link. One way of increasing the efficiency of distribution includes transcoding from a legacy compression method, e.g., MPEG-2 to newer more efficient methods used, e.g., H264. In some configurations, re-transcoding back to the legacy compressed form, e.g., MPEG-2 may be necessary at the other end of the critical link(s). This however requires full transcoding from the legacy method to a newer more efficient method, and such full transcoding may generate additional quantization errors and is computationally intense, and thus may not always be desirable.

SUMMARY

Embodiments of the present invention include a method, and apparatus, and logic encoded in one or more computer-readable tangible medium to carry out a method. The method is to decode and re-encode data compressed by a first compression method to produce data encoded by a second coding method in a lossless manner. The second coding method produces data that is, on average, more compressed than the data compressed by the first compression method.

One embodiment includes a method comprising receiving data compressed using the first compression method that includes codewords generated by variable length coding sets of quantized transform coefficients using a first variable length coding method. The method further includes decoding the codewords to create ordered sets of quantized transform coefficients, each created set forming an ordered series of quantized transform coefficients, and re-encoding the created ordered sets of quantized transform coefficients using a second variable length coding method to produce a re-coded set of codewords. The second variable length coding method produces shorter codewords, on average, than the first variable length coding method. The decoding and re-encoding is a lossless process such that no additional quantization or other errors are introduced to the received data by the method.

One embodiment includes logic encoded in one or more tangible media for execution and when executed operable to carry out a the method.

One embodiment includes a computer-readable carrier medium carrying instructions that when executed by one or more processors cause the one or more processors to carry out a method comprising: (a) receiving data compressed using the first compression method that includes codewords generated by variable length coding sets of quantized transform coefficients using a first variable length coding method; (b) decoding the codewords to create ordered sets of quantized transform coefficients, each created set forming an ordered series of quantized transform coefficients; and (c) re-encoding the created ordered sets of quantized transform coefficients using a second variable length coding method to produce a re-coded set of codewords. The second variable length coding method produces shorter codewords, on average, than the first variable length coding method. The decoding and re-encoding is a lossless process such that no additional quantization or other errors are introduced to the received data by the method.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

BRIEF DESCRIPTION OF THE DRAWINGS

FIG. 7 shows as example matrix of coefficient indices in the zig-zag matrix with several candidates for the breakpoints to illustrate embodiments of the present invention that use a hybrid coding method.

FIG. 13 shows an example 3-dimensional code table, illustrated in a 2-dimensional manner, that contains the integrated position/amplitude symbols for a maximum cluster of 8 non-zero-valued coefficients, and that can be used for integrated 3D position/amplitude coding of low-frequency region coefficients in one embodiment of the invention.

DESCRIPTION OF EXAMPLE EMBODIMENTS

Embodiments of the invention include a method of improving the compression of an image or set of images, e.g., video that has been compressed by a first transform compression method, without fully transcoding so as not to generate additional quantization or other errors in the resulting compressed data.

Figure 1:
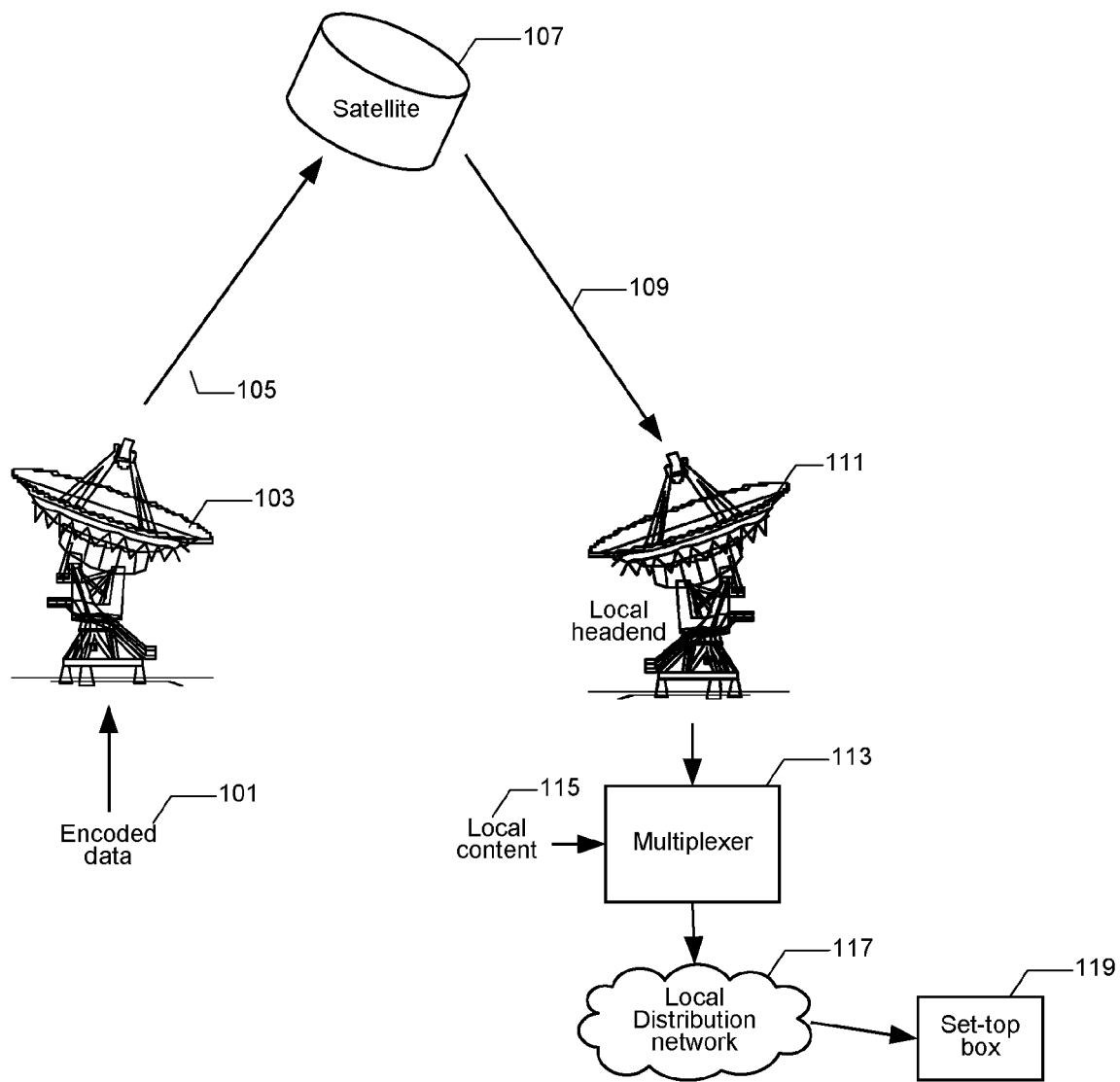
FIG. 1 shows an example of a prior art video distribution network that can benefit from the invention.

FIG. 1 shows an example of a prior art video distribution network that can benefit from the invention. In this example, a compressed video source is provided, e.g., a compressed video stream 101 compressed according to a method that includes a first variable length coding method, e.g., a stream conforming to the MPEG-2 standard. In the example shown, the first-method-compressed stream is modulated and sent via a transmitter 103 to a satellite 107 via a satellite link 105. Normally this process is done either at the video service providers' central office or the video content suppliers' place. At the downlink site, a satellite receiver 111 receives and demodulates the signal from the satellite 107 via a satellite link 109 e.g., to an MPEG-2 stream. The received MPEG-2 stream is typically but not necessarily multiplexed by a multiplexer 113 with one or more other compressed streams 115 such as one or more of: local advertisements, video-on-demand (VOD) services, local programs, and other programs such as programs from the Internet. The updated multiplexed signal is sent to an end location such as a home set-top box 119 of an end user via a local distribution network 117. The local distribution network to the set top box may include one or more of: a coaxial cable distribution network link, a digital subscriber loop access network link, an ATM network link, an optical network link, an IP-based packet network link, a satellite link, a wireless digital transmission link, and a terrestrial station link. Normally the transmitting to the end user's set-top box process is done by the video service providers' headend that is used to service a particular neighborhood.

Some of the links between the video source and the end point, e.g., the up and down satellite links 105, 109 may involve relatively expensive network capacity. Therefore, it would be advantageous to increase the compression efficiency for this link. However, there may be little processing power at the transmitter and/or receiver, and further, there may be a need to preserve the same quality, and further, any re-processing may have to be carried out relatively rapidly or with little processing power.

Recently, there have been developed improved methods for entropy coding applicable to transform image compression. These entropy coding methods can improve the performance over the entropy coding methods used in standard methods such as the various MPEG, ITU, and other standard transform compression methods. For example, the inventors have discovered that these new methods offer improved compression ratios over using traditional two-dimensional variable length coding. Embodiments of the invention include a method of improving the compression of an image or set of images, e.g., video that has been compressed by a first image compression method that is a transform compression method, without fully transcoding and thus without generating additional error for the compressed data. Starting with data that has been compressed using the first image compression method—a transform compression method—embodiments include incorporating the newer entropy coding methods to improve the compression ratio.

Figure 2:
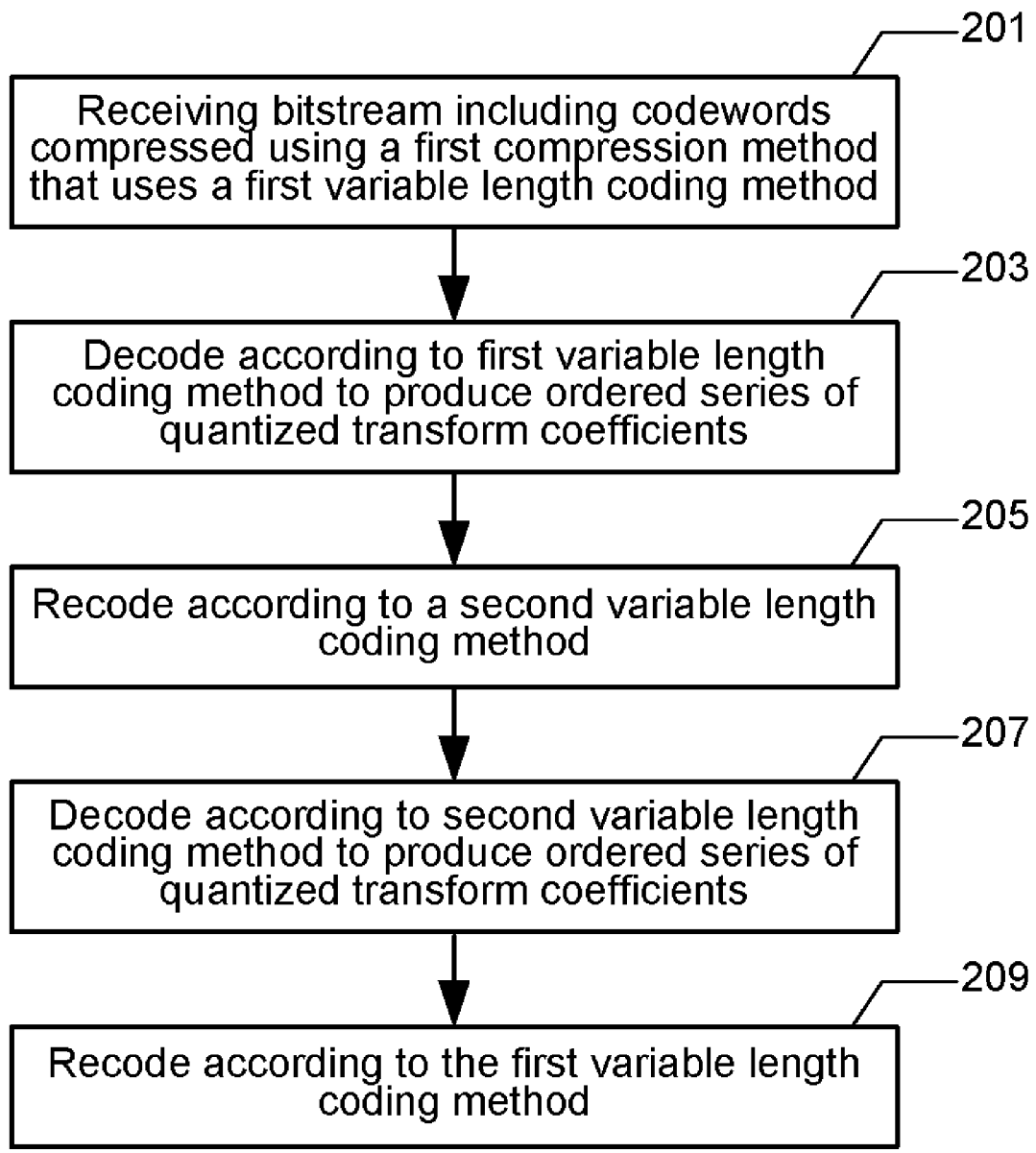
FIG. 2 shows a simplified flowchart of one embodiment of the invention.

FIG. 2 shows a simplified flowchart of one embodiment of the invention. 201 includes receiving data compressed using a first compression method, e.g., MPEG2, or in another embodiment, H.264. The accepted data includes codewords generated by a first variable length coding method that encodes an ordered set of quantized transform coefficients of blocks of image data.

The method includes in 203 decoding the codewords to create ordered sets of quantized transform coefficients of the image blocks of quantized coefficients. Each created set forms an ordered series of quantized transform coefficients. The method further includes in 205 re-encoding the created ordered sets of quantized transform coefficients using a second variable length coding method to produce a re-coded set of codewords. The second variable length coding method is selected because it produces, on average, shorter codewords than the first variable length coding method.

The combination of the decoding of 203 and re-encoding of 205 is a lossless process such that no additional quantization or other errors are introduced to the re-encoded data by the method.

In some applications, it may be necessary to create a bitstream that is compatible with the original bitstream, i.e., that is compressed using the first compression method. For example, in the case the original bitstream was MEPG2, it may be needed to create an MPEG2 compatible stream.

One embodiment of the invention includes starting with compressed data that includes codewords generated by the second variable length coding method. The method includes in 207 decoding the codewords to re-create ordered sets of quantized transform coefficients of the image blocks of quantized coefficients. The method further includes in 209 re-encoding the re-created ordered sets of quantized transform coefficients using the first variable length coding method to produce a further re-coded set of codewords which are included in a bitstream that is compatible with the first compression method. The combination of the decoding of 207 and re-encoding of 209 is a lossless process such that no additional quantization or other errors are introduced to the further re-encoded data by the method.

Such an embodiment using 207 and 209 is useful, for example, if data is required to be in the original "legacy" compressed format of the original data accepted in 201, i.e., in data compressed according to the first compression method.

Figure 3:
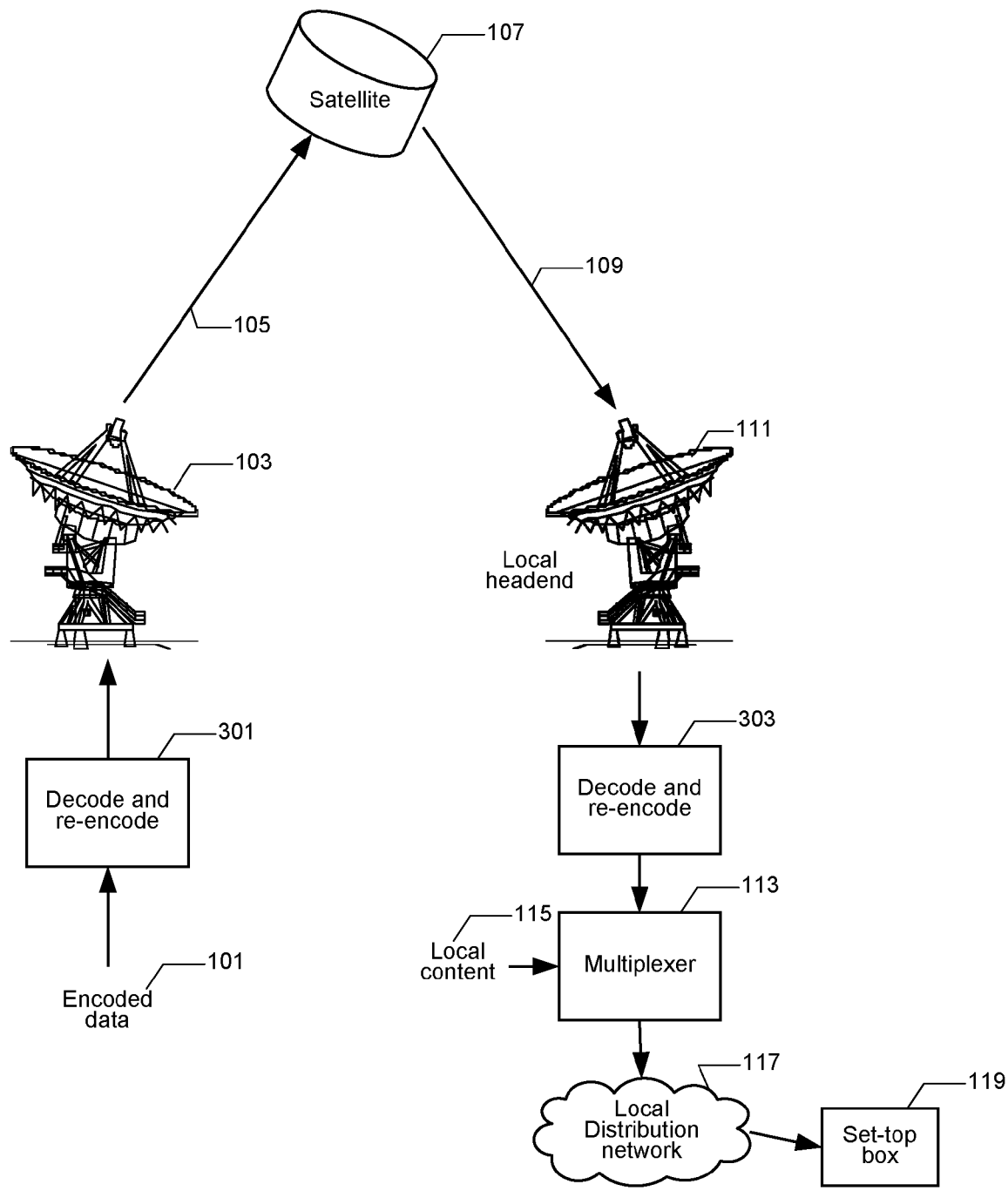
FIG. 3 shows one example application of an embodiment of the method to the example shown in FIG. 1.

FIG. 3 shows one example application of an embodiment of the method to the example shown in FIG. 1. In FIG. 3, the original stream of encoded data 101 is accepter by a first decoder and re-encoder 301 that decodes and re-encodes (203 and 205 of FIG. 2) to create a new stream that is transmitted by transmitter 103 and link 105 to the satellite 107 then sent via link 109 to the receiver 111. In this example, it is desired to create a stream encoded in the same manner as the encoded data 101, so 303 includes a second decoder and re-encoder 303 that decodes and re-encodes (207 and 209 of FIG. 2) to create a stream that is encoded in the same manner as encoded data 101. This data is multiplexed by multiplexer 113 with local content and the distributed via the local distribution network 117 to a subscriber via the set-top box 119.

Examples of the First and Second Coding Methods

Figure 4A:
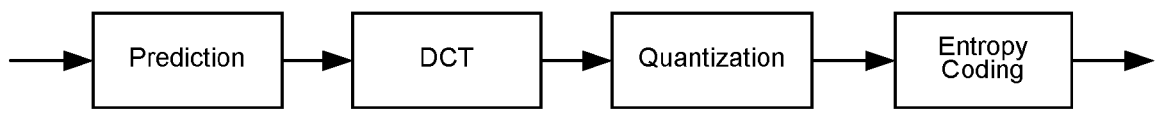
FIG. 4A shows a simplified block diagram of a transform based video compression method.

In the following, it is assumed that the first compression method conforms to one of the transform video coding standards, e.g., MPEG1, MPEG2, MPEG3 (part 10, AVC), VC-1 or one of the ITU-T H.26x recommendations, where x in an integer. Such standards commonly adopt a codec that uses block-based motion compensation, transform, quantization, and entropy coding. The motion compensation acts as a temporal model, which attempts to reduce temporal redundancy by exploiting the similarities between neighboring video frames. The output of the temporal model is a residual frame, e.g., created by subtracting the prediction from the actual current frame, and a set of model parameters, typically a set of motion vectors describing how the motion was compensated. The residual frame forms the input to a spatial model which exploits the similarities between neighboring samples in the residual frame to reduce spatial redundancy. This is achieved by applying a transform such as a DCT or similar transform to the residual samples and quantizing the results. The transform converts the samples into a frequency domain in which they are represented by transform coefficients. The coefficients are quantized to remove insignificant values, leaving a small number of significant coefficients that provide a more compact representation of the residual frame. The quantized coefficients are then compressed by an entropy coder, which removes the statistical redundancy in the data. FIG. 4A shows a simplified block diagram of a transform based video compression method. It is assumed herein that the first compression method is a transform method that conforms to the general architecture of FIG. 4A.

The present invention relates to the entropy coding.

Zig-Zag Scan and Run-Level Coding

Figure 4B:
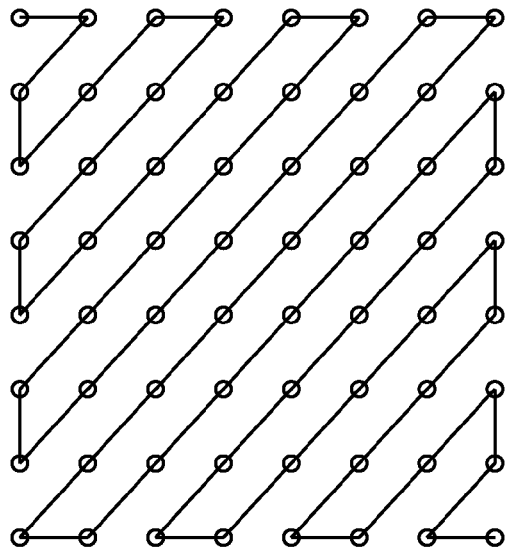
FIG. 4B shows an example zig-zag scan order for a frame block, and provides an ordering of the transform coefficients

Quantized transform coefficients are desired to be compactly encoded. In a transform-based image or video encoder, the output of the quantization is usually a sparse array containing a few non-zero-valued coefficients and a large number of zero-valued coefficients. To allow efficient representation prior to entropy encoding, the transform coefficients are ordered along a path from relatively low to relatively high frequency, which tends to group together non-zero-valued coefficients. FIG. 4B shows an example zig-zag scan order for a frame block, and provides an ordering of the transform coefficients—in this case, a zig-zag scan starting from the DC (top-left) coefficient.

The output of the ordering process is an array that typically contains one or more clusters of non-zero-valued coefficients near the start, followed by runs of contiguous zero-valued coefficients. To represent the large number of zero values more compactly, the coefficient array is conventionally represented by a series of (run, level) pairs where run indicates the number of zero-valued coefficients preceding a non-zero-valued coefficient and level indicates the magnitude of the non-zero-valued coefficient. Because higher-frequency DCT coefficients are very often quantized to zero and an ordered block usually ends in a run of zero-valued coefficients, the final non-zero-valued coefficient in the block is specially treated. If "two-dimensional" run-level coding is used, a separate code symbol, 'last', is used to indicate the end of the non-zero values. In the case of "three-dimensional" run-level coding, each symbol is encoded with three quantities, run, level, and last.

The entropy encoder assigns a variable length codeword to represent each of the aforementioned symbols. This typically uses a variable length coding (VLC) table designed such that the more commonly-occurring symbols are encoded by shorter binary codes and less commonly-occurring symbols are encoded by longer binary codes, thus resulting in a compressed bitstream.

Relative Inefficiency of Run-Level Coding in Standards-Based Compression

Figure 5:
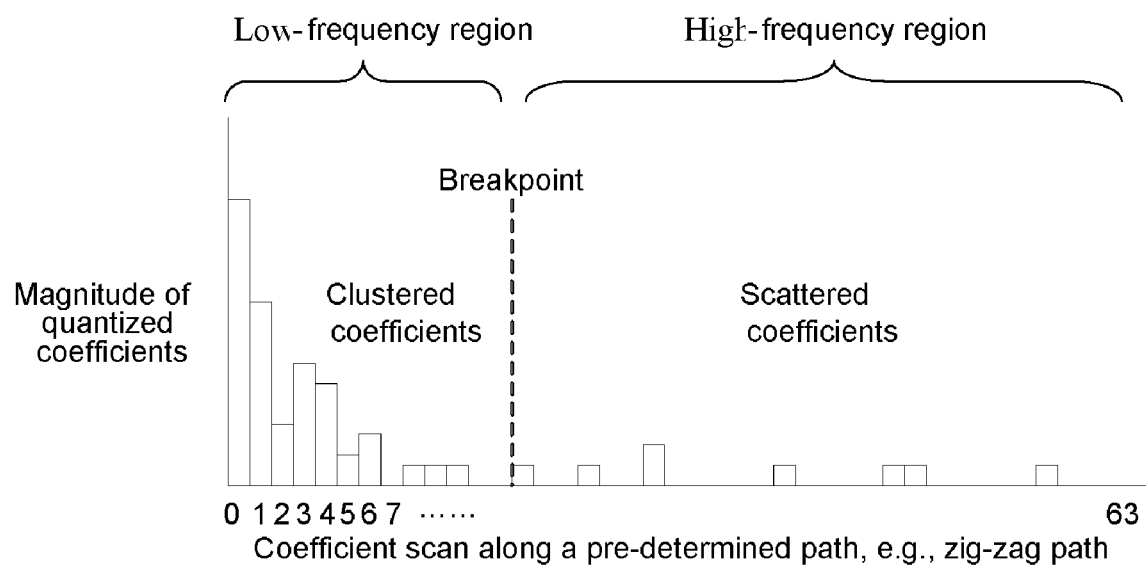
FIG. 5 illustrates an example of coefficient distribution of a transform block along a pre-determined path in a typical compression method as used in some embodiments of the present invention.

The inventors have noticed that in the block-based transform coding, most of the significant DCT coefficients are concentrated on the upper-left corner of the block designated as "low frequency" positions. Furthermore, the non-zero DCT coefficients tend to cluster around the DC coefficient, and the distribution is generally symmetrical in the horizontal and vertical directions. FIG. 5 illustrates an example of coefficient distribution of a transform block along a pre-determined path in a typical compression method as used in some embodiments of the present invention. The non-zero-valued coefficients are statistically more clustered in the low-frequency (LF) region whereas non-zero-valued coefficients are more scattered in the high-frequency (HF) region.

Intra-frame coding (where no motion compensation is used) and inter-frame coding of higher-resolution images (where a smaller quantization step size is employed) tend to generate more clustered coefficients in the low-frequency region. While the conventional run-level-based VLC is efficient in coding scattered non-zero-valued coefficients, it is inefficient in coding clustered non-zero-valued coefficients. This is due to the fact that "n" numbers of (run, level) codes are needed to code the clustered "n" non-zero-valued coefficients instead of using alternative codes with less number of binary bits.

The Second Variable Length Coding Method.

The second variable length coding method can be one of sets of new variable length coding methods recently developed that provide, on average, improved performance.

The methods of one set of new methods are each called hybrid variable length coding. Hybrid variable length coding includes identifying or accepting at least one breakpoint in the ordering of the series that partitions the series into at least a first, e.g., low-frequency region wherein non-zero-valued coefficients are likely to be clustered, and a second, e.g., high frequency region wherein non-zero-valued coefficients are likely to be scattered amongst zero-valued coefficients. A variable length coding method suitable for clustered coefficients is used to encode the first region coefficients, and a variable length coding method suitable for the scattered coefficients is used to encode the second region coefficients.

See for example International Patent Application No. PCT/US2005/020110 filed Jun. 8, 2005, titled "HYBRID VARIABLE LENGTH CODING FOR VIDEO COMPRESSION," and published as International Patent Publication WO 2006001994.

See also the following U.S. Patent Applications:

U.S. patent application Ser. No. 10/869,229, filed 15 Jun. 2004 to inventors Chen, et al., and titled "A HYBRID VARIABLE LENGTH CODING METHOD FOR LOW BIT RATE VIDEO CODING," published as US 20050276487.

U.S. patent application Ser. No. 10/898,654, filed 22 Jul. 2004 to inventors Chen, et al., and titled "AN EXTENDED HYBRID VARIABLE LENGTH CODING METHOD FOR LOW BIT RATE VIDEO CODING," Published as US 20050276497.

U.S. patent application Ser. No. 10/910,712, filed 3 Aug. 2004 to inventors Chen, et al., and titled "VIDEO COMPRESSION USING MULTIPLE VARIABLE LENGTH CODING PROCESSES FOR MULTIPLE CLASSES OF TRANSFORM COEFFICIENT BLOCKS," published as US 20050276498.

U.S. patent application Ser. No. 10/922,508, filed 18 Aug. 2004 to inventors Toebes, et al., and titled "TWO-DIMENSIONAL VARIABLE LENGTH CODING OF RUNS OF ZERO AND NON-ZERO TRANSFORM COEFFICIENTS FOR IMAGE COMPRESSION," published as US 20060039621.

U.S. patent application Ser. No. 10/922,507, filed 18 Aug. 2004 to inventors Chen, et al., and, titled "VIDEO CODING USING MULTI-DIMENSIONAL AMPLITUDE CODING AND 2-D NON-ZERO/ZERO CLUSTER POSITION CODING," published as US 20060039620.

U.S. patent application Ser. No. 11/069,622, filed 28 Feb. 2005 to inventors Chen, et al., and titled "AMPLITUDE CODING FOR CLUSTERED TRANSFORM COEFFICIENTS," published as 20060039616.

U.S. patent application Ser. No. 11/069,621, filed 28 Feb. 2005 to inventors Chen, et al., and titled "JOINT AMPLITUDE AND POSITION CODING FOR PHOTOGRAPHIC IMAGE AND VIDEO CODING," published as 20060039615.

U.S. patent application Ser. No. 11/069,620, filed 28 Feb. 2005 to inventors Wu, et al., and titled "ADAPTIVE BREAKPOINT FOR HYBRID VARIABLE LENGTH CODING."

U.S. patent application Ser. No. 11/270,138, filed 9 Nov. 2005 to inventors Chen, et al., and titled "EXTENDED AMPLITUDE CODING FOR CLUSTERED TRANSFORM COEFFICIENTS," published as US 20060056720.

A second set of new variable length coding methods include methods that are suitable for when there are clusters of non-zero-valued coefficients in the ordered series. See for example, above cited U.S. patent application Ser. Nos. 10/922,508, 10/922,507, 11/069,622, 11/069,621, and 11/270,138. See also U.S. patent application Ser. No. 11/385,183, filed Mar. 20, 2006 to inventors Chen, et al., and titled "VARIABLE LENGTH CODING FOR CLUSTERED TRANSFORM COEFFICIENTS IN IMAGE COMPRESSION," published as US 20070019877.

A third set of new methods include variable length coding methods that are suitable for when the non-zero-valued coefficients are scattered amongst zero-valued coefficients in the ordered series. See for example, the second region coding methods in the hybrid methods in the above-cited patent applications, and U.S. patent application Ser. No. 11/346,757, filed 3 Feb. 2006 to inventors Chen, et al., and titled "VARIABLE LENGTH CODING FOR SPARSE COEFFICIENTS.

See also U.S. patent application Ser. No. 10/910,712 filed Aug. 3, 2004 to inventors Chen, et al., titled "VIDEO COMPRESSION USING MULTIPLE VARIABLE LENGTH CODING PROCESSES FOR MULTIPLE CLASSES OF TRANSFORM COEFFICIENT BLOCKS."

In addition to the methods described in the above patent applications, there also are other methods newer than that of traditional 2D-VLC. Some such methods are described in U.S. patent application Ser. No. 10/439,536 filed May 16, 2003 inventors Chen et al., and titled "VARIABLE LENGTH CODING METHOD AND APPARATUS FOR VIDEO COMPRESSION," published as US 20040228540. Other methods are described in U.S. patent application Ser. No. 10/342,537 filed Jan. 15, 2003 inventors Chen et al., and titled "AN EXTENSION OF TWO-DIMENSIONAL VARIABLE LENGTH CODING FOR IMAGE COMPRESSION." Chen et al. See also other methods described in U.S. patent application Ser. No. 10/440,595 filed May 19, 2003 to inventors Chen et al., and titled "AN EXTENSION OF TWO-DIMENSIONAL VARIABLE LENGTH CODING FOR IMAGE COMPRESSION."

The contents of above-cited International Patent Application No. PCT/US2005/020110 and each of above-cited U.S. patent application Ser. Nos. 10/342,537; 10/439,536; 10/440, 595, 10/869,229; 10/898,654; 10/910,712; 10/922,508; 10/922,507; 11/069,622; 11/069,621; 11/069,620; 11/270, 138; 11/385,183; and 11/346,757 are incorporated herein by reference.

Hybrid Variable Length Coding (HVLC)

Some embodiments of the present invention use a hybrid coding method for the second variable length coding method. Several variations of a hybrid method are described in above-cited International Patent Application No. PCT/US2005/ 020110 and U.S. patent application Ser. Nos. 10/869,229, 10/898,654, 10/910,712, 10/922,508, 10/922,507, 11/069, 622, 11/069,621, 11/069,620, and 11/270,138. Based upon the observation that there is a first, e.g., low-frequency region along the ordering of the quantized coefficients where non-zero-amplitude quantized coefficients are likely to be clustered, and a second, e.g., high-frequency region along the ordering where any non-zero-amplitude quantized coefficients are likely to be scattered among zero-valued coefficients, a more efficient variable length coding is developed to code the clustered low-frequency coefficients while the conventional run-level VLC or its equivalent is retained to code the scattered high-frequency coefficients. Such a hybrid entropy coding scheme is referred to as hybrid variable length coding (HVLC) hereinafter and were first introduced as the Basic Hybrid VLC Method and Extended Hybrid VLC Method.

In the hybrid variable length coding, a breakpoint along the coefficient scan path is first defined, as shown in FIG. 5. The coefficients below and above the breakpoint are considered as low- and high-frequency coefficients, respectively. An alternative coding scheme is used for the low-frequency coefficients, and the run-level VLC or an equivalent scheme is used for the high-frequency coefficients. Furthermore, to avoid using two codewords for one coefficient around the breakpoint, the breakpoint is extended beyond the low-frequency region until the last coefficient in this region is completely coded. This extended breakpoint is termed soft breakpoint.

Figure 6:
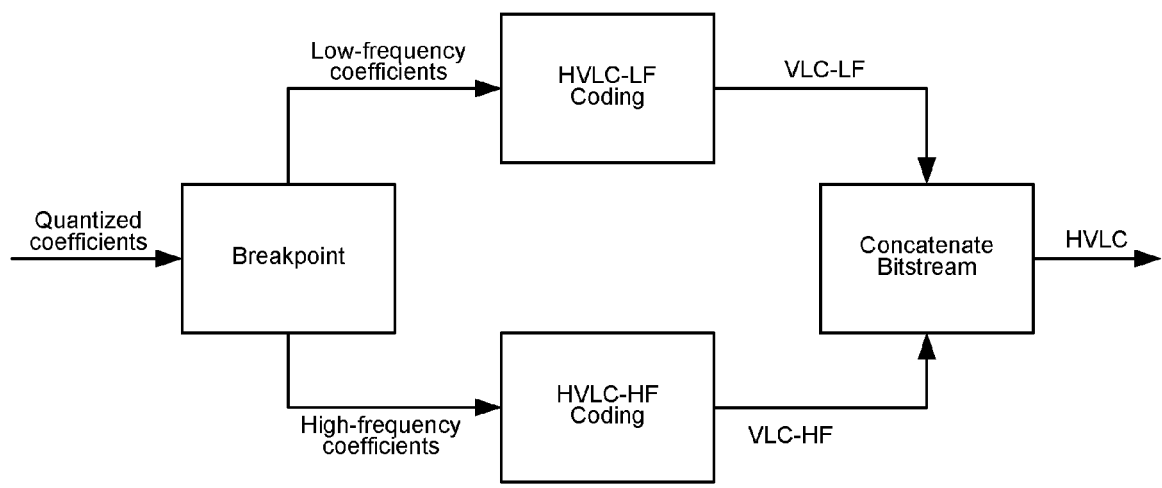
FIG. 6 shows a simplified block diagram of hybrid variable length coding as used in some embodiments of the present invention.

FIG. 6 shows a simplified block diagram of hybrid variable length coding as used in some embodiments of the present invention.

Embodiments for Determining the Breakpoint for Hybrid Variable Length Coding

The breakpoint, as defined above, is a coefficient index along the ordering path that separates the coefficients into low-frequency and high-frequency regions. Although in general the breakpoint can change from one block to another, in some embodiments of the second coding method used in some embodiments of the present invention the breakpoint, for simplicity is the same for all blocks, including intra- and inter-coded blocks. Furthermore, the coefficient fort the breakpoint is selected such that the low-frequency and also the high-frequency coefficients are symmetric in the horizontal and vertical directions. This way, the same numbers of coefficients in the horizontal and vertical frequency regions are included. FIG. 7 shows as example matrix of coefficient indices in the zig-zag matrix with several candidates for the breakpoints.

For example, in the zig-zag matrix shown in FIG. 7, several candidates for the breakpoints are 2, 5, 9, 14, and 20 . . . , all of which provide the equal numbers of coefficients in the horizontal and vertical directions.

Different Low-Frequency Coding Methods for Hybrid Variable Length Coding

Embodiments of the present invention that use a hybrid coding method for the second variable length coding method can use one of a plurality of methods for the low-frequency region.

Conventional run-level coding is efficient in representing the high-frequency (HF) non-zero-valued coefficients, as they are scattered along the scanned path, while it is inefficient in representing clustered low-frequency (LF) coefficients. Several low-frequency coding methods are described herein below. In one embodiment, conventional (2D) VLC is used for the high-frequency coefficients.

Figure 8:
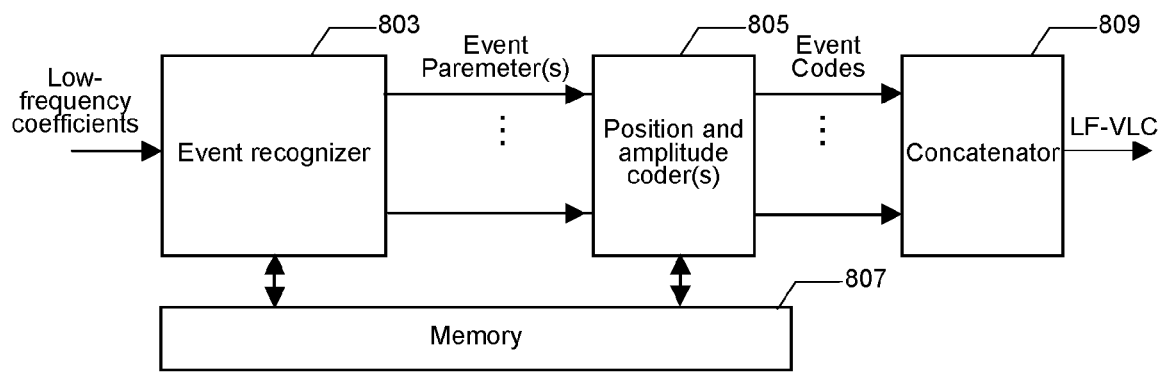
FIG. 8 shows one embodiment of an apparatus for encoding the low-frequency region coefficients using one or more VLC tables.

FIG. 8 shows one embodiment of an apparatus for encoding the low-frequency region coefficients using one or more VLC tables. An event recognizer 803 recognizes events describable by one or more parameters, such as the runlengths of zero value coefficients, runlengths of non-zero-amplitude coefficients, amplitudes, signs, and so forth. These parameter (s) is/are output(s) from the event recognizer 803 and accepted by an encoder 805 that in one embodiment includes a lookup device to look up the appropriate one or more lookup tables. The event codes are concatenated by a concatenator 809. The embodiment shown in FIG. 8 includes a memory 807 that stores the lookup tables separate from the lookup device. In another embodiment, the lookup device includes a memory that stores the one or more lookup tables.

One-dimensional Position and One-dimensional Amplitude Coding (1DP1DA)

Embodiments of low-frequency variable length coding include representing two items of information for non-zero-valued coefficients in a block: the position and the amplitude. In addition, the sign of non-zero-valued coefficients needs to be represented. In one embodiment, conventional run-level coding represents the position and amplitude information for each non-zero-valued coefficient individually. In one embodiment, for a cluster of non-zero-valued coefficients, an alternative way of denoting the position and amplitude information is to indicate (a) the run of zero-valued coefficients preceding the non-zero cluster, (b) the run of non-zero-valued coefficients in the cluster, and (c) the magnitudes (and the signs) of the non-zero-valued coefficients. Three symbols: zrun, nzrun, and level, are used to denote the information. Thus, one embodiment includes recognizing events hat are denoted by these symbols.

Figure 9:
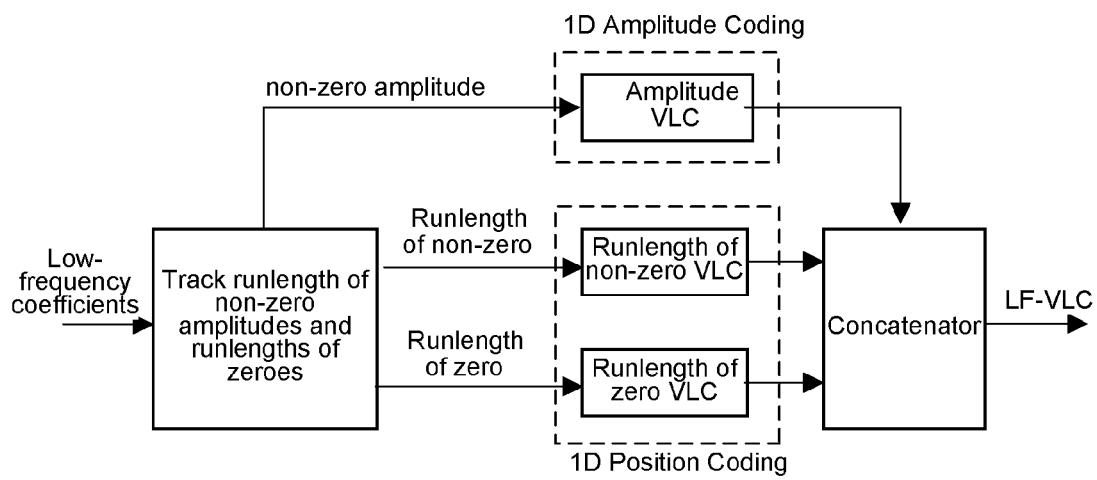
FIG. 9 shows a simplified block diagram of a one-dimensional position and one-dimensional amplitude coding scheme used in some embodiments of the invention.

In one embodiment, each of the events denoted by these is encoded by a variable length code, e.g., using a variable length coding table. Such a VLC table can be constructed by collecting statistics of consecutive non-zero-valued coefficients from test video sequences, or assuming such statistics, and applying Huffman coding to the collected statistics. Note that in practice, some of the less likely-to-occur events are encoded by fixed length codes. Such a coding scheme for low-frequency coefficients is referred to as one-dimensional position and one-dimensional amplitude coding herein, as both the position and amplitude information is encoded by one-dimensional (1D) VLC. FIG. 9 shows a simplified block diagram of an embodiment of one-dimensional position and one-dimensional amplitude coding. For the low-frequency coefficients that are before the breakpoint, the encoder finds events that include the runlength of zero-valued coefficients, the runlength of non-zero-valued coefficients, and the amplitudes of the non-zero-valued coefficients, and encodes them using three respective 1D VLC tables. In one embodiment, the codewords are then concatenated to present a complete bitstream. Note that in a practical implementation, the breakpoint and other information also may need to be encoded in the bitstream, and such details are not included in this description.

As an example, consider the following low-frequency quantized coefficients of a block after the zig-zag ordering process:

2 3 2 −1 −1 0 0 1 −1 1 | 0 0 . . .

where | represents the breakpoint. Coding the above coefficients by one-dimensional position and one-dimensional amplitude coding generates the following codeword stream:

$C_n(5) C_A(2) S(0) C_A(3) S(0) C_A(2) S(0) C_A(1) S(1) C_A(1)$
$S(1) C_z(2) C_n(3) C_A(1) S(0) C_A(1) S(1) C_A(1) S(0)$ EOB where $C_n(\bullet)$, $C_z(\bullet)$, and $C_A(\bullet)$ denotes the codes for the runlength of non-zero-valued coefficients, the runlength of zero-valued coefficients, and the amplitude of the non-zero-valued coefficient, respectively. S(0) and S(1) denote + and − signs of a non-zero-valued coefficient, respectively. EOB represents an "end-of-block" symbol and is used to indicate the end of non-zero-valued coefficients in the block.

Two-dimensional Position and One-dimensional Amplitude Coding (2DP1DA)

Another embodiment, rather than using two one-dimensional variable length codes to encode the runlength of zero-valued coefficients and the runlength of non-zero-valued coefficients, uses a two-dimensional (2D) variable length code to jointly encode events that include a run of consecutive zero-valued coefficients preceding a run of non-zero-valued coefficients. So jointly encoding events by a 2D variable length code is found to be, on average, more efficient than encoding the same symbols by two independent 1D variable length codes.

In one embodiment, in order to ensure that the events that include a run of non-zero-valued coefficients are orthogonal, a single zero immediately following each non-zero cluster is included as part of the event. This effectively reduces the runlength of the zero-valued coefficients by 1 and the dimension representing runlength of zero-valued coefficients will start from 0 instead of 1.

Figure 10:
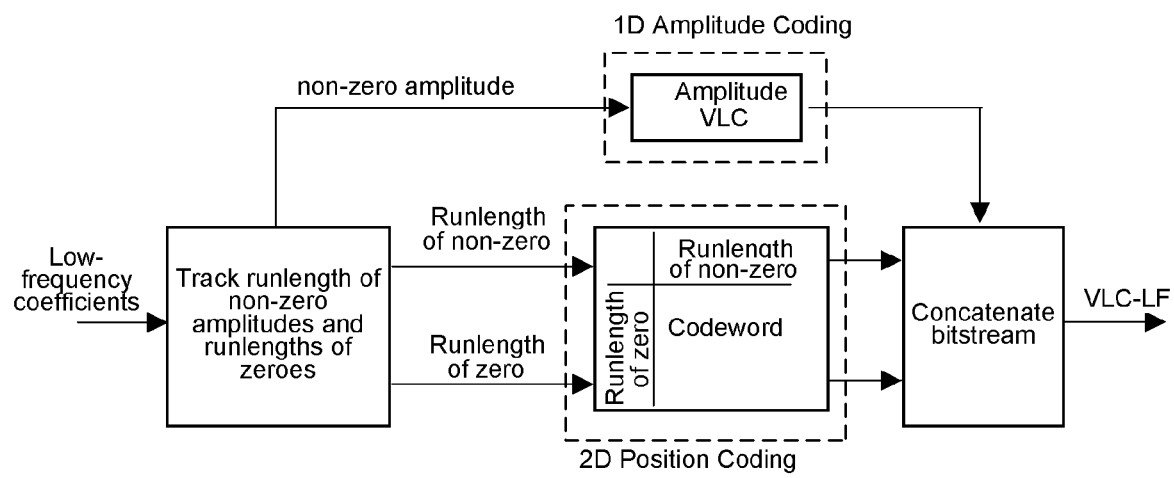
FIG. 10 shows a simplified block diagram of a method used in some embodiments of the invention that includes, in the low-frequency region of a series of coefficients, two-dimensional position coding.

FIG. 10 shows a simplified block diagram of a method used in some embodiments of the invention that includes, in the low-frequency region of a series of coefficients, two-dimensional position coding for encoding events that include any run of zero-valued coefficients preceding a run of non-zero-valued coefficients, and encoding amplitude events using one-dimensional amplitude coding for the non-zero-amplitudes in the runs. No immediately preceding run is indicated by a runlength of zero.

The inventors have found that extending the 2D position events can be extended to include the "last" information representing the end of the block. Using two-dimensional position and one-dimensional amplitude coding, consider again the sample coefficient series:

2 3 2 −1 −1 0 0 1 −1 1 | 0 0 . . .

This is encoded as:

$C_p(0, 5, 0) C_A(2) S(0) C_A(3) S(0) C_A(2) S(0) C_A(1) S(1)$
$C_A(1) S(1) C_p(1, 3, 1) C_A(1) S(0) C_A(1) S(1) C_A(1) S(0)$ where $C_p$(zrun, nzrun, last) denotes the 2D position code of an identified event. Note that in the above stream of codewords, the second position code is "$C_p(1, 3, 1)$" rather than "$C_p(2, 3, 1)$" because the first zero coefficient has been implicitly included in the first position event coded as $C_p(0, 5, 0)$.

While such 2D position coding is anticipated to provide on average improved coding efficiency over two 1D position coding, the size of the code table used is increased. For an 8×8 block, i.e., 64 coefficients along the scan path, the total size of a 2-D code table is roughly 2×63×64=8K, including accounting for the last information. In practice, to reduce the table size, symbols that are relatively unlikely to appear may be coded by an "Escape" code followed by fixed numbers of bits, which indicate the runs of zero- and non-zero-valued coefficients as well as the last information.

Two-dimensional Position and Multi-dimensional Amplitude Coding (2DPmDA)

Figure 11:
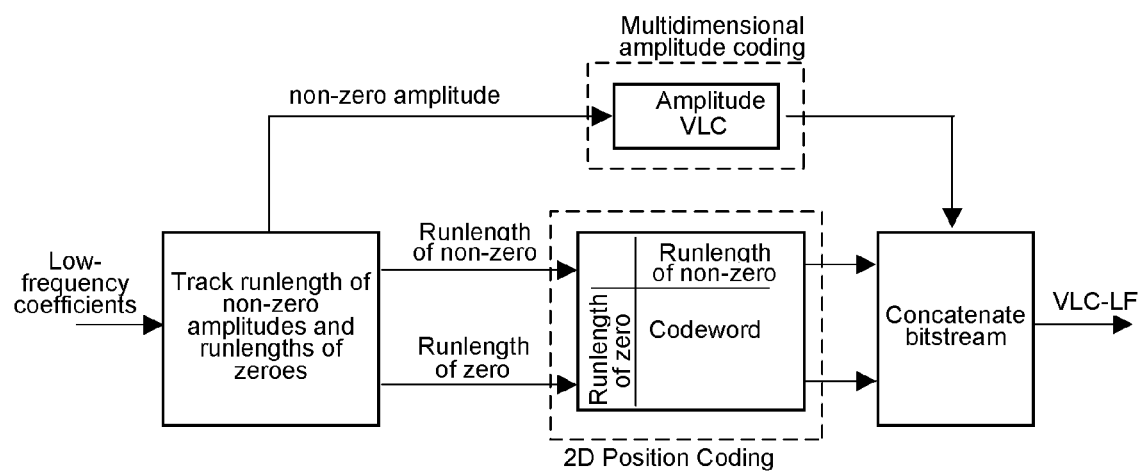
FIG. 11 shows a simplified block diagram of a two-dimensional position and multi-dimensional amplitude coding method that can be used in embodiments of the present invention.

One embodiment of the invention that uses hybrid coding includes recognizing and encoding two-dimensional position events and, rather than one-dimensional amplitude variable length coding, uses multi-dimensional variable length coding to encode runs of more than one consecutive non-zero-valued amplitudes. That is, for a run of "m" consecutive non-zero-valued coefficients, instead of using "m" one-dimensional variable length codes, a single 'm' dimensional code, e.g., coding table is used to code the entire 'm' coefficients. As an illustration, the sample coefficient sequence:

2 3 2 −1 −1 0 0 1 −1 1 | 0 0 . . .

can be encoded as:

$C_p(0, 5, 0)$ $C_{A5}(2, 3, 2, 1, 1)$ S(0) S(0) S(0) S(1) S(1) $C_p(1, 3, 1)$ $C_{A3}(1, 1, 1)$ S(0) S(1) S(0)

where $C_{A5}(2, 3, 2, 1, 1)$ is used to denote the 5-dimensional amplitude code of the event (2, 3, 2, 1, 1) and $C_{A3}(1, 1, 1)$ denotes the 3-dimensional amplitude code of the event (1, 1, 1). FIG. 11 shows a simplified block diagram of a two-dimensional position and multi-dimensional amplitude low-frequency region coding method that can be used in embodiments of the present invention.

While extending "m" one-dimensional amplitude codes to one m-dimensional amplitude code is possible, the size of the m-dimensional code table can become too large for some practical implementations. As an example, if the magnitude of the non-zero-valued coefficients is between 1 to 31 as defined in many video standards, the size of the largest table can become as large as $31^m$. In order to make the size of the m-dimensional tables manageable for a practical implementation, the size of m in some embodiments is restricted to a relatively low number such as 2 or 3. The number of non-zero-valued coefficients beyond the restricted numbers is resorted back to use multiple one-dimensional tables.

Integrated Position and Amplitude Coding (mDPAInt), also Called Joint Position and Amplitude Coding.

Figure 12:
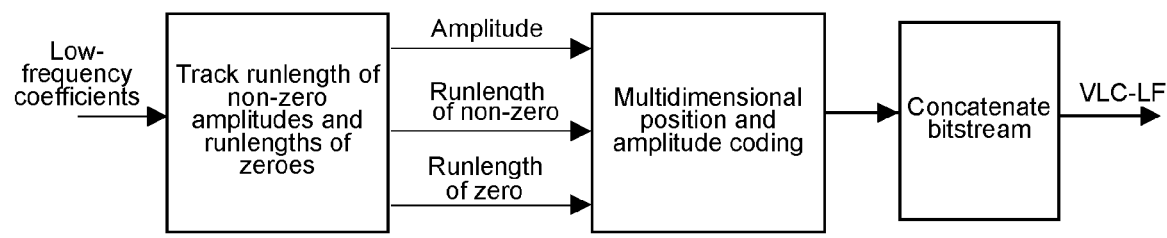
FIG. 12 shows a simplified block diagram of a joint position and amplitude coding scheme used in some embodiments of the present invention.

Rather than encoding the position and amplitude of clustered non-zero-valued coefficients in the low-frequency region independently, some embodiments of low frequency encoding include jointly coding the position and the amplitude events. As an illustration, the sample coefficient sequence:

2 3 2 −1 −1 0 0 1 −1 1 | 0 0 . . .

can be encoded as:

$C_{pA}(0, 5, 0; 2, 3, 2, 1, 1)$ S(0) S(0) S(0) S(1) S(1) $C_{pA}(1, 3, 1; 1, 1, 1)$ S(0) S(1) S(0)

where $C_{pA}(•, •, . . . )$ represents a joint position and amplitude variable length code implemented, for example, using a joint position and amplitude variable length code table. FIG. 12 shows a simplified block diagram of a joint position and amplitude coding scheme used in some embodiments of the present invention.

While joint (m+2)-dimensional position and amplitude coding without size limitation is possible, in a practical implementation, the size of the code table is typically limited. For example, the magnitude of the coefficients and the number of coefficient clusters is limited to relatively small values.

Integrated Position and Amplitude Coding with Low Valued Amplitude and Low Number of Clusters, e.g., 3D Integrated Position and Amplitude Coding In clustered non-zero-valued coefficients, it was observed that the magnitude of the quantized transform coefficients is dominated by the magnitude value 1. One embodiment of integrated position and amplitude low-frequency region encoding exploits this to further improve the coding efficiency. More specifically, the appearances of clusters of consecutive runs of amplitude-1 coefficients or consecutive non-zero-non-amplitude-1 coefficients are extracted from the amplitude symbols and jointly encoded with 2D coefficient positions as an integrated 3D position/amplitude coding. Needless to say, all non-zero-valued coefficients with magnitude other than one must be coded by an additional 1D variable length code. Since it is already known that all the non-1 amplitudes have magnitudes of larger than 1, in one embodiment, their magnitudes are subtracted by 1 prior to encoding to construct shorter codewords.

Excluding the "last" information, one embodiment of integrated 3D position/amplitude events recognizes events that are defined by three quantities: runlength of any preceding zero coefficients, runlength of the non-zero-valued coefficients, and wherein the non-zero-valued coefficient is amplitude 1 or not. No immediately preceding run is indicated by a runlength of zero. FIG. 13 shows an example 3-dimensional code table, illustrated in a 2-dimensional manner, that contains the integrated position/amplitude symbols for a maximum cluster of 8 non-zero-valued coefficients, where 'x' represents a non-zero-valued coefficient that has amplitude other than one.

The size of the table such as shown in FIG. 13 grows exponentially as the number of non-zero clusters increase. One embodiment includes limiting the size of the table by limiting the maximum length of non-zero coefficient clusters. In one such embodiment, all the symbols with non-zero clusters exceeding the maximum cluster length are encoded by an "Escape" code followed by fixed numbers of bits indicating the corresponding information.

As an illustration, the sample coefficient sequence:

2 3 2 −1 −1 0 0 −1 1 | 0 0 . . .

can be encoded (including last) as:

$C_{pA}(0, 5, xxx11, 0)$ $C'_A(1)$ S(0) $C'_A(2)$ S(0) $C'_A(1)$ S(0) S(1) S(1) $C_{pA}(1, 3, 111, 1)$ S(0) S(1) S(0), where $C_{pA}(•, •, •, •)$ represents the variable length code for the integrated position/amplitude symbols including the runlength of zero-valued coefficients, the runlength of non-zero-valued coefficients, the 1/non-1 magnitudes, and the last information, and where $C'_A(•)$ represents the 1D variable length code for one less than the magnitude of non-zero-valued coefficients that have amplitudes other than-one.

Other Coding Methods for Use as the Second VLC Method

One embodiment of the second variable length coding method is as follows. Suppose the amplitudes form a first subset of values, including zero-amplitude and at least one other value, and a second subset of values. The method includes recognizing events that are each a run of any zero-valued coefficients followed by a run of one or more identical sequences of a predefined set of sequences. No immediately preceding run is indicated by a runlength of zero. The predefined set of sequences are either a single amplitude from the second subset of amplitudes or a sequence of one or more coefficients each having amplitude from the first subset of amplitudes, starting with a non-zero amplitude. These events are encoded by a variable length code such that relatively short codewords are formed to represent events that are relatively more likely to occur, and relatively long codewords are formed to represent events that are relatively less likely to occur.

A variation of this embodiment for the second variable length coding method is as follows. Again suppose the amplitudes form a first subset of values, including zero-amplitude and at least one other value, and a second subset of values. The method includes forming a codeword for each event of a set of events. Each event is a any consecutive zero-valued coefficients followed by a run of one or more identical sequences of a predefined set of sequences, each sequence in the predefined set of sequences being either a single coefficient having an amplitude from the second subset of amplitudes or a sequence of one or more coefficients each having amplitude from the first subset of amplitudes, starting with a non-zero amplitude. The method includes providing with the codewords information indicative of the sign of any non-zero amplitude in the events.

Another embodiment of the second variable length coding method is as follows. Again suppose the amplitudes form a first subset of values, including zero-amplitude and at least one other value, and a second subset of values. The method includes forming a codeword for each of a set of modes encountered in the decoded ordered series of quantized coefficients, with a distinct mode defined for each amplitude of the second subset of values; and, for each encountered mode, forming a codeword for the events in the ordered series of quantized coefficients for the encountered mode, each event of each mode that is defined by an encountered amplitude of the second subset of values being the runlength of any zero-valued signals followed by such encountered amplitude when all non-zero amplitudes and the encountered amplitude are considered as if they had the most common encountered amplitude. The coding is such that relatively short codewords are formed to represent modes that are relatively more likely to occur, and within any mode, relatively short codewords are formed to represent events that are relatively more likely to occur.

In one version, the first subset of values consists of zero amplitude and at least one non-zero amplitude, and a first mode is defined for the non-zero amplitude of the first subset, such that each event of each mode is defined by an encountered amplitude other than the most common amplitude, and such that an event for each mode is defined by the runlength of any run of consecutive zero-valued coefficients precede an encountered non-zero amplitude when all nonzero amplitudes and the encountered amplitude are considered as if they had the most common encountered amplitude.

In another version, a first mode includes one or more sequences of a predefined set of sequences of one or more signals each having amplitude from the first subset of amplitudes, starting with a non-zero amplitude, and each event in the first mode is any run of zero-valued coefficients followed by a run of one or more identical sequences of the predefined set of sequences as if all amplitudes of the second subset of values are equal to the most common amplitude.

Decoding

Referring again to FIG. 2, one embodiment of decoding a bitstream such as bitstream 101 in 203 includes recognizing codewords in the bitstream, and using one or more code tables to decode the recognized codewords. The particular code tables and the codeword recognizing depends on the particular entropy coding method used as the first variable length coding method.

Similarly, one embodiment of decoding the bitstream encoded using the second variable length coding method in 207 includes recognizing codewords in the bitstream, and using one or more code tables to decode the recognized codewords. The particular code tables and the codeword recognizing depends on the particular entropy coding method used as the second variable length coding method.

Another embodiment of the invention is an apparatus operable to decode a bitstream. Such an apparatus may in one embodiment be used to carry out the decoding of 203. Another embodiment of such as apparatus is used to decode in 207 the bitstream encoded using the second variable length coding method.

Figure 14:
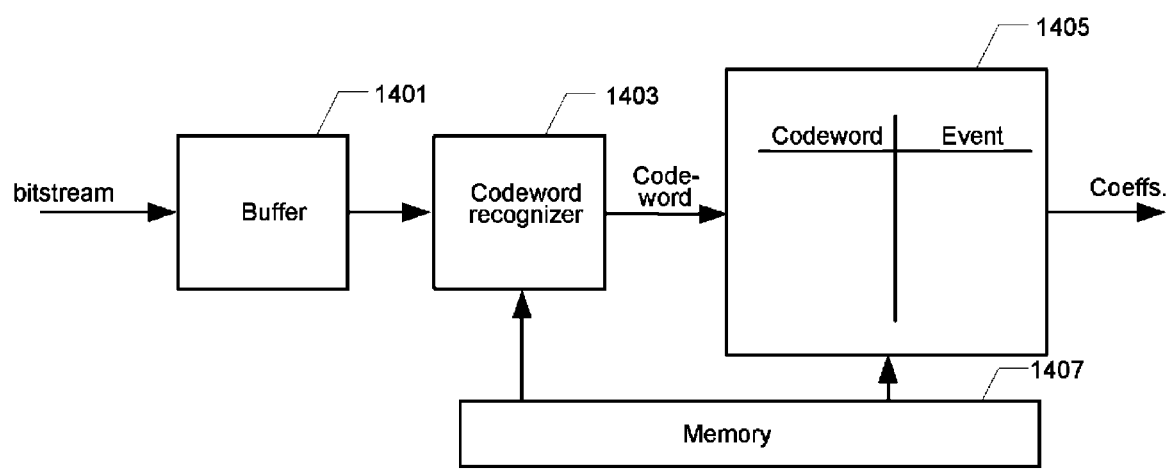
FIG. 14 shows a decoding apparatus according to one embodiment of the invention.

FIG. 14 shows one embodiment of a decoder. The apparatus includes an input buffer 1401 that is operable to accept a bitstream encoded by a compression method that includes a variable length coding method that, for example, uses an event recognizer and one or more coding tables to code recognized events. The output of the buffer acts as input to a codeword recognizer 1403 that accepts the bits of the input bitstream and that is operable to determine which of the coding tables the codeword is from. A decoder 1405 is coupled to the codeword recognizer 1403 and is operable to determine the data for the codeword recognized by the codeword recognizer, e.g., the runlength of non-zero-valued coefficients, the runlength of zero-valued coefficients, the amplitude(s), the sign, etc. In one embodiment, the decoder 1405 includes a lookup device that looks up the appropriate decoding table stored in a memory 1407. That table provides the event for at least some of the codewords of the set of codewords. Other codewords may include an "escape" code, so that decoding is by other than a table lookup method.

While in the embodiment shown in FIG. 14, the memory is shown separate from the lookup device (decoder) 1405, those in the art will understand that in other embodiments, the lookup device 1405 includes memory for the tables, and such other embodiments are included herein.

Figure 15:
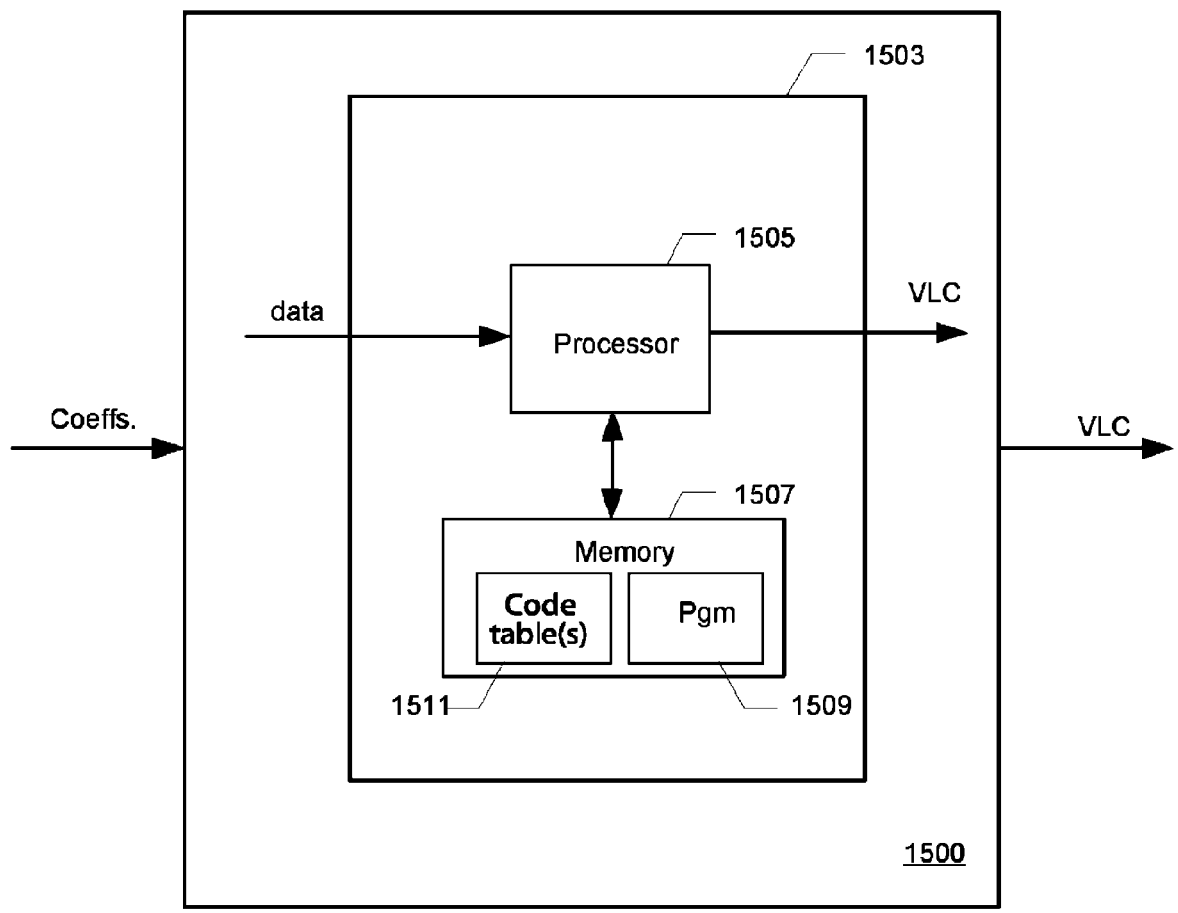
FIG. 15 shows a coding apparatus that includes a processing system according to one embodiment of the invention.

FIG. 15 shows another embodiment that includes an apparatus 1500 that is operable to implement the second VLC method used in 205 in FIG. 2. Apparatus 1500 includes processing system 1503 that includes one or more processors 1505 and a memory 1507. A single processor is shown in FIG. 15 and those in the art will appreciate that this may represent several processors. Similarly, a single memory subsystem 1507 is shown, and those in the art will appreciate that the memory subsystem may include different elements such as RAM, ROM, and so forth. In addition, the memory subsystem is meant to include any non-volatile memory storage such as a magnetic or optical storage component. A computer program 1509 is included and is loaded into the memory 1507. Note that at any time, some of the programs may be in the different parts of the memory subsystem, as will be understood by those in the art. The program 1509 includes instructions to instruct the processor to implement, in different versions, the different coding methods usable as the second variable length coding method. In the embodiment shown, the method uses one or more coding tables 1511 in the memory subsystem 1507.

Figure 16:
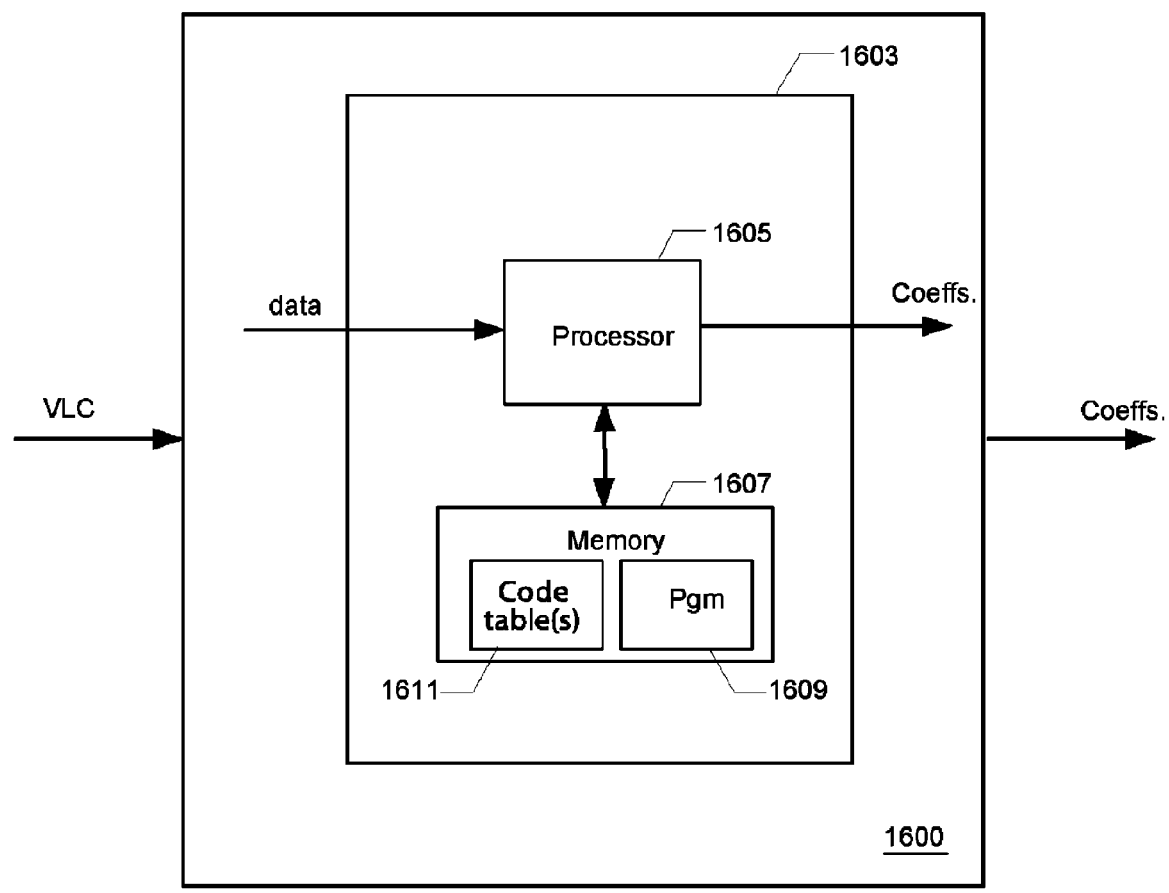
FIG. 16 shows a decoding apparatus that includes a processing system according to one embodiment of the invention.

FIG. 16 shows another embodiment that includes an apparatus 1600 operative to implement a decoder of a variable length coding method, e.g., to implement decoding 203 of FIG. 2 or decoding 207 of FIG. 2. Decoding apparatus 1600 includes a processing system 1603 that includes one or more processors 1605 and a memory 1607. A single processor is shown in FIG. 16 and those in the art will appreciate that this may represent several processors. Similarly, a single memory subsystem 1607 is shown, and those in the art will appreciate that the memory subsystem may include different elements such as RAM, ROM, and so forth. In addition, the memory subsystem is meant to include any non-volatile memory storage such as a magnetic or optical storage component. A computer program 1609 is included and is loaded into the memory 1607. Note that at any time, some of the programs may be in the different parts of the memory subsystem, as will be understood by those in the art. The program 1609 includes instructions to instruct the processor to implement, in different versions, the recognizing and decoding of codewords. In the embodiment shown, the decoding method uses one or more coding tables 1611 in the memory subsystem 1607.

Thus, a method to decode according to first variable length coding method and re-encode according to second variable length coding method has been described, as has an apparatus to so decode and code, and software for so carrying out the methods.

Note that when the second variable length coding method is a hybrid coding method, a breakpoint determining method is included suitable for determining the breakpoint to define at least a first and second region in an ordered series of quantized transform coefficients of blocks of images as occur in common image compression methods, such that the coefficients in the first region can be encoded using a first region method, and the coefficients in the second region can be encoded using a second region coding method.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a re-coder or compressed image or video data. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing a set of instructions for execution by one or more of the processors and that cause the one or more processors to perform any one or more of the methodologies of the present invention. A carrier medium may take many forms, including but not limited to non-volatile media and volatile media. Non-volatile media includes, for example, optical, magnetic disks, and magneto-optical disks. Volatile media includes dynamic memory, such as main memory. For example, the term "carrier medium" shall accordingly be taken to included, but not be limited to, solid-state memories, and a computer product embodied in optical and magnetic media.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Furthermore, the invention is not limited to any one type of architecture or type of transform encoding. For example, the DCT is mentioned above as one transform. Other transforms may be used, e.g., the new H.264/MEG-4 AVC video coding standard/draft standard defines 4×4 blocks and a DCT-like 4×4 integer transform. The invention does not depend on any particular type of inter-frame coding if used, or of motion compensation if used for inter-frame coding, or any intra-estimation if used for estimating the pixels of a block using information from neighboring blocks.

Furthermore, in the description of example embodiments it was assumed that the quantization of coefficients is such that zero is the most likely to occur amplitude, and 1 is the next most likely to occur amplitude. Of course it is possible to quantize in a manner so that other values or symbols are used for the most likely-to-occur quantized value or values, and different other values or symbols are used for the next most likely-to-occur quantized value or values. Those in the art will understand how to modify the particulars described herein to accommodate such variations, and such variations are certainly meant to be within the scope of the present invention.

Note that variable length coding is sometimes referred to as entropy coding or statistical coding.

Note that the terms coding and encoding are used interchangeably herein.

Note also that while the embodiments above included separate sign bits for the sign, the sign can be incorporated into any of the amplitude coding methods.

Note that in some of the above examples for amplitude encoding, 63 or 127 possible non-zero values are assumed for the coefficients, the invention is not restricted to any number of possible quantization values.

Note also that the term amplitude is irrespective of sign. Therefore, for example, coefficient of values +1 and −1 both have amplitude 1.

In some of the embodiments described above, no sign data was included. Most transforms produce positive and negative coefficients, and the forming of the codeword includes an indication of the sign of any non-zero-valued coefficients. In one version, the sign information for any runs of non-zero amplitudes in any region is added together with the information of each amplitude. In an alternate embodiment, the sign information for any runs of non-zero amplitudes in any region may be included in a different manner, e.g., as a code for the series of signs. Other alternate embodiments are also possible for encoding the sign.

In the embodiments described above, the forming of the codeword includes an indication of the sign of any non-zero coefficients. In one version, the sign information for any runs of non-zero amplitudes in the first region is added together with the information of each amplitude. In an alternate embodiment, the sign information for any runs of non-zero amplitudes in the first region may be included in a different manner, e.g., as a code for the series of signs. Other alternate embodiments are also possible for encoding the sign.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of VLC used for any of the coding methods, e.g., the coding tables, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claims:

1. A method of operating a processing apparatus comprising:
   receiving data compressed using a first compression method that includes codewords generated by variable length coding sets of quantized transform coefficients using a first variable length coding method;
   decoding the codewords to create ordered sets of quantized transform coefficients; and
   re-encoding the created ordered sets of quantized transform coefficients using a second variable length coding method to produce a re-coded set of codewords, wherein the second variable length coding method produces shorter codewords, on average, than the first variable length coding method,
   wherein the decoding and re-encoding is a lossless process such that no additional quantization or other errors are introduced to the received data by the method.

2. A method as recited in claim 1, further comprising decoding the re-coded set of codewords to produce new ordered sets of quantized transform coefficients, and re-coding the new ordered set of quantized transform coefficients using the first variable length coding method.

3. A method as recited in claim 1, wherein the second variable length coding method is a hybrid variable length coding method.

4. A method as recited in claim 3,
   wherein each ordered set of quantized transform coefficients produced by the decoding includes a most-likely-to-occur amplitude and at least one other amplitude, including a next-most-likely-to-occur amplitude,
   wherein the re-encoding includes for each created ordered set of quantized transform coefficients:
      providing or establishing at least one breakpoint along the ordering of the series to break the series into a plurality of contiguous regions according to an assumed or determined distribution of amplitudes of the quantized coefficients in each region, each region having a corresponding coding process that includes recognizing events and forming codewords for the series, including codewords for the events; and
      for each region of the series, applying the coding process corresponding to the region to form a set of codewords of the series,
   such that relatively short codewords are formed to represent values or sequences of values that are relatively more likely to occur, and relatively long codewords are formed to represent values or sequences of values that are relatively less likely to occur.

5. A method as recited in claim 1,
   wherein the quantized coefficients of transformed image blocks are such that the most-likely-to-occur amplitude is 0, and the next most-likely-to-occur amplitude is 1.

6. A method as recited in claim 4,
   wherein the quantized coefficients of transformed image blocks are such that the most-likely-to-occur amplitude is 0, and the next-most-likely-to-occur amplitude is 1,
   wherein the establishing of the at least one breakpoint establishes a breakpoint along the ordering of the series to define a first contiguous region and a second contiguous region, such that clusters of consecutive non-zero-valued amplitude values are likely to occur mostly in the first contiguous region, and wherein the applying the encoding for each region includes:
  encoding the coefficients in the first region using a first region encoding method that includes recognizing events, and coding the recognized events, the first region encoding method being selected for encoding clusters of consecutive non-zero-valued amplitude values; and
  encoding the coefficients in the second region using a second region encoding method,
wherein the first region and second region encoding methods include variable length codes such that relatively short codewords are formed to represent sequences of values that are relatively more likely-to-occur, and relatively long codewords are formed to represent sequences of values that are relatively less likely-to-occur.

7. A method as recited in claim 6,
wherein the second variable length coding method includes for each first region:
  for a particular contiguous region in the series:
    (a) for each of a subset of a number of amplitude values, the number at least one, the amplitude values in the subset being amplitude 1 and, if the number is greater than one, the next most likely to occur amplitude value or values to the next-to-most likely-to-occur amplitude value, identifying events of a first kind that each includes an ending coefficient having the amplitude value either immediately preceded by a run of one or more consecutive zero-amplitude coefficients, or not immediately preceded by any zero-valued coefficient, each event distinguished by its ending non- zero-valued amplitude value, and by the greater or equal to zero runlength of the run;
    (b) for each of the subset of amplitude values, encoding the identified events of the first kind by respective codewords according to a variable length coding method corresponding to the ending amplitude value, the coding method to jointly encode the ending amplitude and the runlength, including a runlength of zero, and designed such that for at least some of the possible events, relatively more likely-to-occur events of the first kind are encoded by a shorter codeword than relatively less likely-to-occur events of the first kind;
    (c) identifying events of a second kind that include a single ending coefficient having an amplitude other than the amplitude values of the subset, either immediately preceded by a run of one or more consecutive zero-valued coefficients or not immediately preceded by any zero-valued coefficient, each event of the second kind identified by its greater or equal to zero runlength;
    (d) encoding the identified events of the second kind by respective codewords according to a second variable length coding method designed such that for at least some of the possible events of the second kind, relatively more likely-to-occur events of the second kind are encoded by a shorter codeword than relatively less likely-to-occur events of the second kind; and
    (e) encoding, according to a third coding method, the series of coefficients in the concatenation of the coefficients having amplitudes other than the amplitudes of the subset,
such that relatively short codewords are formed to represent signal values or sequences of signal values that are relatively more likely-to-occur, and relatively long codewords are formed to represent signal values or sequences of signal values that are relatively less likely-to-occur.

8. A method as recited in claim 1,
wherein each ordered set of quantized transform coefficients produced by the decoding each have an amplitude from the amplitude set consisting a first subset of values and a second subset of values, the first subset of values including the most common amplitude and at least one other amplitude,
wherein the re-encoding includes:
  forming a codeword for each event of a set of events, each event being a run of none of more signals having the most common amplitude followed by a run of one or more identical sequences of a predefined set of sequences, each sequence in the predefined set of sequences being either a single signal having an amplitude from the second subset of amplitudes or a sequence of one or more signals each having amplitude from the first subset of amplitudes, starting with an amplitude other than the most common amplitude,
such that relatively short codewords are formed to represent events that are relatively more likely to occur, and relatively long codewords are formed to represent events that are relatively less likely to occur.

9. A method as recited in claim 1,
wherein each ordered set of quantized transform coefficients produced by the decoding each have an amplitude from the amplitude set consisting a first subset of values and a second subset of values, the first subset of values including the most common amplitude and at least one other amplitude,
  forming a codeword for each event of a set of events, each event being a run of none of more signals having the most common amplitude followed by a run of one or more identical sequences of a predefined set of sequences, each sequence in the predefined set of sequences being either a single signal having an amplitude from the second subset of amplitudes or a sequence of one or more signals each having amplitude from the first subset of amplitudes, starting with an amplitude other than the most common amplitude,
  providing with the codewords information indicative of the sign of any amplitude other than the most common amplitude in the events,
such that relatively short codewords are formed to represent events that are relatively more likely to occur, and relatively long codewords are formed to represent events that are relatively less likely to occur.

10. A method as recited in claim 1,
wherein each ordered set of quantized transform coefficients produced by the decoding each have an amplitude from the amplitude set consisting of a first subset of values and a second subset of values, the first subset of values including the most common amplitude and at least one other amplitude,
  forming a codeword for each of a set of modes encountered in the series of quantized coefficients a distinct mode defined for each amplitude of the second subset of values; and
  for each encountered mode, forming a codeword for the events in the series of quantized coefficients for the encountered mode, each event of each mode that is defined by an encountered amplitude of the second subset of values being the runlength of any signals having the most common amplitude followed by such encountered amplitude when all amplitudes other than the most common amplitudes and the encountered amplitude are considered as if they had the most common encountered amplitude, herein no immediately preceding run is indicated by a runlength of zero, such that relatively short codewords are formed to represent modes that are relatively more likely to occur, and within any mode, relatively short codewords are formed to represent events that are relatively more likely to occur.

11. A method as recited in claim 10, wherein the first subset of values consists of the most common amplitude and at least one other amplitude, and wherein a first mode is defined for the amplitude of the first subset other than the most common amplitude, such that each event of each mode is defined by an encountered amplitude other than the most common amplitude, and such that an event for each mode is defined by the runlength of a run of none-or more consecutive most common amplitudes that precede an encountered amplitude other than the most common when all amplitudes other than the most common amplitudes and the encountered amplitude are considered as if they had the most common encountered amplitude.

12. A method as recited in claim 10, wherein a first mode includes one or more sequences of a predefined set of sequences of one or more signals each having amplitude from the first subset of amplitudes, starting with an amplitude other than the most common amplitude, each event in the first mode being any run of one or more consecutive signals having the most common amplitude followed by a run of one or more identical sequences of the predefined set of sequences as if all amplitudes of the second subset of values are equal to the most common amplitude, wherein no immediately preceding run is indicated by a runlength of zero.

13. A tangible computer-readable storage medium having instructions stored therein that when executed by one or more processors cause the one or more processors to carry out a method comprising:
    receiving data compressed using a first compression method that includes codewords generated by variable length coding sets of quantized transform coefficients using a first variable length coding method;
    decoding the codewords to create an ordered set of quantized transform coefficients; and
    re-encoding the created ordered set of quantized transform coefficients using a second variable length coding method to produce a re-coded set of codewords, wherein the second variable length coding method produces shorter codeword, on average, than the first variable length coding method,
    wherein the decoding and re-encoding is a lossless process such that no additional quantization or other error is introduced to the received data by the method.

14. A tangible computer-readable storage medium as recited in claim 13, wherein the method further comprises decoding the re-coded set of codewords to produce the ordered set of quantized transform coefficients, and re-coding the ordered set of quantized transform coefficients using the first variable length coding method.

15. A tangible computer-readable storage medium as recited in claim 13, wherein the second variable length coding method is a hybrid coding method.

16. A method as recited in claim 6, wherein the second variable length coding method includes for each first region using two-dimensional position and one-dimensional amplitude coding.

17. A method as recited in claim 6, wherein the second variable length coding method includes for each first region using one-dimensional position and one-dimensional amplitude coding.

18. A method as recited in claim 6, wherein the second variable length coding method includes for each first region using integrated position and amplitude coding.

19. A method as recited in claim 6, wherein the second variable length coding method includes for each first region using two-dimensional position and multi-dimensional amplitude coding.

20. A method as recited in claim 6, wherein the second variable length coding method includes for each first region using integrated position and amplitude coding with low valued amplitude and low number of clusters coding.

* * * * *